US006085320A

United States Patent [19]
Kaliski, Jr.

[11] Patent Number: 6,085,320
[45] Date of Patent: Jul. 4, 2000

[54] CLIENT/SERVER PROTOCOL FOR PROVING AUTHENTICITY

[75] Inventor: Burton S. Kaliski, Jr., Wellesley, Mass.

[73] Assignee: RSA Security Inc., Bedford, Mass.

[21] Appl. No.: 08/845,196

[22] Filed: Apr. 21, 1997

Related U.S. Application Data

[63] Continuation-in-part of application No. 08/648,442, May 15, 1996, abandoned.

[51] Int. Cl.$^7$ ........................................... H04L 9/00
[52] U.S. Cl. ................................................ 713/168
[58] Field of Search ............................ 380/30; 713/168, 713/170, 176, 189, 200

[56] References Cited

U.S. PATENT DOCUMENTS

| | | | |
|---|---|---|---|
| 4,309,569 | 1/1982 | Merkle . | |
| 4,885,778 | 12/1989 | Weiss . | |
| 5,005,200 | 4/1991 | Fischer | 380/30 |
| 5,224,163 | 6/1993 | Gaser et al. | 380/30 |
| 5,261,002 | 11/1993 | Perlman et al. | 380/30 |
| 5,367,573 | 11/1994 | Quimby | 380/25 |
| 5,444,780 | 8/1995 | Hartman, Jr. | 380/30 |
| 5,625,693 | 4/1997 | Rohatgi et al. | 380/23 |
| 5,757,914 | 5/1998 | McManis | 713/200 |
| 5,963,649 | 10/1999 | Sako | 380/30 |
| 5,970,145 | 10/1999 | McManis | 713/200 |

OTHER PUBLICATIONS

"Information Technology—Security Techniques—Digital Signature Scheme Giving Message Recover," *International Standard* ISO/IEC 9796 : 1991, pp. i–12.

SET Secure Electronic Transaction Specification,Book 2: Programmer's Guide, Version 1.0, May 31, 1997, pp. 207–213.

PKCS #1: RSA Encryption Standard, An RSA Laboratories Technical Note, Version 1.5, Revised Nov. 1, 1993, pp. 1–17.

RSA Laboratories, PKCS #1 v2.0: RSA Cryptography Standard, Oct. 1, 1998, pp. 1–36.

Bellare, et al. "Optimal Asymmetric Encryption—How to Encrypt with RSA," Nov. 19, 1995, available from http://www-cse.usd.edu/users/mihir, based on an earlier paper published in Advances in Cryptology—Eurocrypt 94 Proceedings, Lecture Notes in Computer Science vol. 950, A. De Santis ed., Springer–Verlag, 1994.

"A Practical Zero–Knowledge Protocol Fitter to Security Microprocessor Minimizing Both Transmission and Memory", L.C. Guillou & J. Quisquater, pp. 123–128.

Fully–Fledged Two–Way Public Key Authentication and Key Agreement for Low–Cost Terminals, M.J. Beller & Y. Yacobi, pp. 999–1000.

"Secure Electronic Transaction (SET) specification", Box 2: Programmers Guide, pp. 57–58, MasterCard and Visa, Jun. 21, 1996.

Beller, M.J., et al. "Fully–Fledged Two–Way Public Key Authentication and Key Agreement for Low–Cost Terminals," *Electronics Letters*, vol. 29, No. 11, May 27, 1993, pp. 999–1000.

Guillou, Louis, et al. "A Practical Zero–Knowledge Protocol Fitted to Security Microprocessor Minimizing Both Transmission and Memory," pp. 123–128.

*Primary Examiner*—Salvatore Cangialosi
*Attorney, Agent, or Firm*—Testa, Hurwitz & Thibeault, LLP

[57] ABSTRACT

A protocol for establishing the authenticity of a client to a server in an electronic transaction by encrypting a certificate with a key known only to the client and the server. The trust of the server, if necessary, can be established by a public key protocol. The client generates and sends over a communications channel a message containing at least a part of a certificate encrypted with the server's public key or a secret session key. The server receives and processes the message to recover at least part of the certificate, verifies and accepts it as proof of the client's authenticity.

42 Claims, 14 Drawing Sheets

CLIENT/SERVER PROTOCOL FOR PROVING AUTHENTICITY

This is a continuation-in-part of application Ser. No. 08/648,442, filed May 15, 1996, now abandoned.

The invention relates to a protocol for one party to an electronic transaction, as for example a client in a client-server transaction, to prove its authenticity to the other party of the transaction.

BACKGROUND OF THE INVENTION

Client-server systems provide electronic access by the client to data, information, accounts and other material stored at the server. In financial transactions, the system provides a client electronic access to accounts and financial resources.

In a client-server transaction, the client is required to prove to the server that it is an authentic client, and not some impersonator or other unauthorized party. Protocols are known by which a client proves to a server its authenticity, while at the same time it does not reveal information that could be misused by a third party.

A standard well known protocol for proving authenticity involves public-key cryptography. The client establishes a public key/private key pair and provides the public key to the server. In a transaction, to prove its authenticity to the server, the client forms a digital signature with its private key on a time-varying message, and the server verifies the digital signature with the client's public key. The time-varying message, which may be a timestamp or a challenge supplied by the server, is different in each instance. This message, when checked by the server, provides safeguards against a third party impersonating the client by simply replaying copies of previous signatures of the client that the third party has intercepted or otherwise acquired.

In the standard protocol described above, the server trusts that the public key belongs to the client, i.e., that the client is in fact actively involved in the transaction because it is presumed that only the client knows the private key and can form valid digital signatures. A convenient way to establish trust in a public key is to use a certificate. This is accomplished by a certification authority issuing public-key certificates signed with the certification authority's private key, which thereby asserts to the server that the client's public key is a valid public key issued by or registered with the certification authority. Assuming the server trusts the certification authority's public key, then it trusts the client's certificate, the client's public key and ultimately the client's authenticity.

With typical public-key cryptosystems, it is computationally expensive to form digital signatures because of the need to perform an exponentiation operation. In some electronic transactions, for example, those involving a smart card client where the computational capacity is limited, the standard protocol using a digital signature is computationally expensive and is therefore a significant burden.

Belier and Yacobi, in an article entitled "Fully-Fledged Two-Way Public Key Authentication and Key Agreement for Low-Cost Terminals" *ELECTRONICS LETTERS*, May 27, 1993, Vol. 29, No. 11, at pages 999–1000, describe a protocol that provides for less on-line computation on one side of the protocol. In this protocol authentication of the server by the client is carried out by the server sending a random challenge with an expected "colour", structure or format, to the client for verification by the client. Authentication of the client by the server is achieved by the client sending to the server its identity, public key, certificate and a signature on the random challenge for verification of the certificate and the signature by the server. The protocol is described as being useful where one side of the interaction is a low-cost customer device such as portable telephones, home banking terminals, smart cards and notebook computers.

Other protocols are known for establishing the authenticity of a client to a server. Client authentication protocols such as those based on secret-key cryptography exist, but often have the limitation that the server must be on-line, or the server must store a key which can be used to impersonate arbitrary clients. In Cellular Digital Packet Data systems, a client authenticates itself to a server by sending a one time password encrypted with a Diffie-Hellman shared key, and the server returns a new password for the next session. Again, the server must be on-line or the client must share a different password with each server, which can be inconvenient.

BRIEF DESCRIPTION OF THE INVENTION

A protocol that is less computationally expensive for a client but achieves similar goals as the standard protocol is used to develop a server's trust in the client. In this protocol, a certificate provided by a trusted certification authority to the client is encrypted with a key known only to the client and the server or the public key of the server. The client forms no digital signature. Since only the client and the server it trusts have access to the certificate, the certificate itself is proof of the authenticity of the client. This protocol is particularly useful in client devices having small computational capacity, e.g., a smart card.

Additional interactive protocols are disclosed whereby messages are exchanged between client and server to establish authenticity of both the client and the server as well as protocols wherein only a portion of the client's certificate is encrypted. Moreover, the certificate can include a one way function, such as a cryptographic hash function of a secret value or a root of a hash tree of secret values for protection against the certification authority or unauthorized servers, respectively.

A still further more general protocol involves a user, which may be an individual, a computer or some other entity, connected to a verifier by way of an encrypted communications channel such that the user can confidentially deliver to the verifier information essential to verify the message.

DESCRIPTION OF THE PREFERRED EMBODIMENTS

The specific description of the invention is set forth in the environment of a smart card client. However, the invention is not limited to a smart card client since the disclosed protocols are applicable to client/server systems in general, and in particular clients having low computational capacity such as portable telephones, notebook computers and home banking terminals. In an even more general manner the disclosed exemplary embodiments as described later can involve a user, which can be an individual, a computer or some other entity, which is connected to a verifier, which can be a client, a server or some other entity, via an encrypted communications channel whereby the user can confidentially deliver to the verifier information essential to verify the message.

Figure 1:
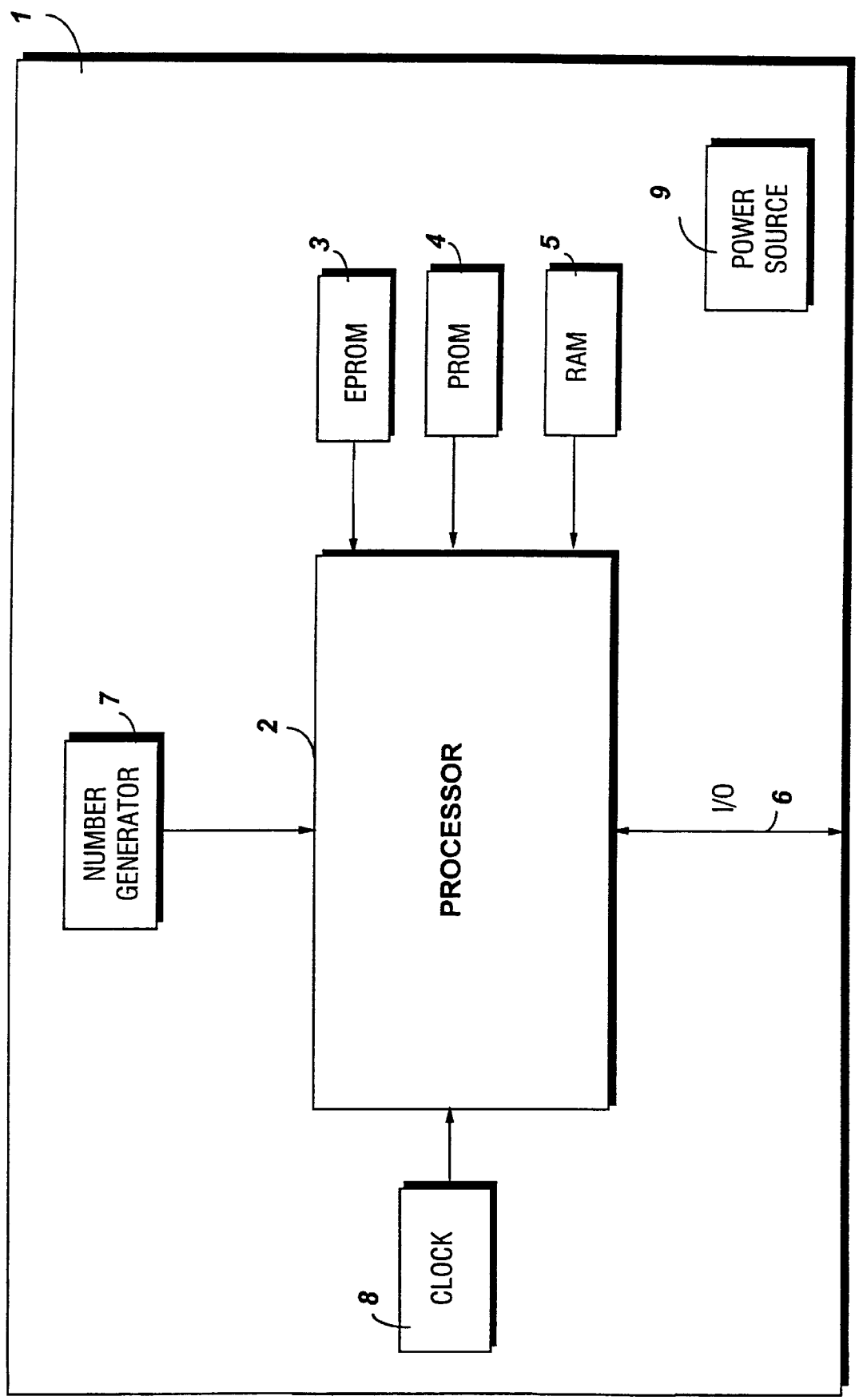
FIG. 1 schematically illustrates the components of a smart card.

A smart card includes a microchip containing a processor and memories to hold programs and data. FIG. 1 illustrates a smart card 1 comprising a processor 2, an erasable programmable read only memory (EPROM) 3, programmable read only memory (PROM) 4, random access memory (RAM) 5, input/output (I/O) port 6, number generator 7, clock 8 and power source 9. PROM 4 holds the card operating system and RAM 5 holds temporary results of calculations. EPROM 3 holds the certificate for the card. This certificate for the card, unlike the usual public key certificate, need not include the public key of the client since authentication of the client by the server does not rely on the public key of the client. A cache of public keys of one or more servers may also be stored in PROM 4 or EPROM 3. Number generator 7 provides random seed numbers to the processor for generating secret session keys. Clock 8, conventional and well known in the art, is used for generating a timestamp and for verifying a received timestamp. Clock 8 is optional where the server's timestamp or time-varying value is used by the client to provide a time-varying value or where a challenge procedure is followed. Power source 9 is a battery when a card has a clock. Otherwise, power may be supplied by an external source or a server. I/O terminals 6 provide a means for external communications.

The public key of a trusted certification authority may be stored in PROM 4 or EPROM 3. PROM 4, or the RAM 5 if non-volatile, may have a section for storing certificate revocation lists (CRLs). Such a list would include a list of servers whose certificates have expired or been revoked. This list would be provided by signed and dated messages from the trusted certification authority either directly or indirectly while in a communicating relationship with a server. Reference to the list during the initial stages of the protocol will indicate whether the transaction being initiated is with a valid server or with one holding a revoked certificate, and thereby whether a received server's certificate is to be verified.

The card manufacturer initializes the smart card using conventional techniques. PROM 4 is loaded with an operating program to be executed by processor 2, clock 8 is set (or an initial time-varying value, e.g., a sequence number or a timestamp is set in one of the memories when a clock is not used) and the certificate associated with the card and the trusted certification authority's public key are loaded into the memories. Optionally, server public keys and CRLs are also loaded into the memories.

Figure 2:
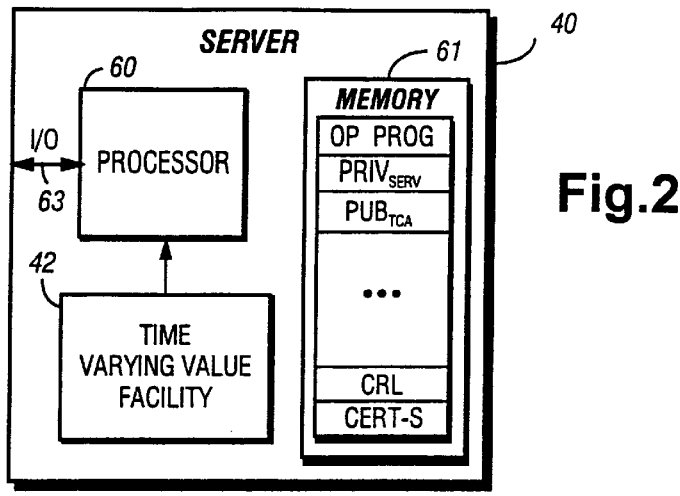
FIG. 2 illustrates the components of a server.

A server 40 as illustrated in FIG. 2 includes a processor 60, a facility for generating a time-varying value or timestamp 42, input/output port 63, and a memory 61 for holding the operating program for the processor, the private key $PRIV_{SERV}$ associated with the server's public key $PUB_{SERV}$ and the public key $PUB_{TCA}$ of the trusted certification authority that signed the client's certificate. In addition, memory 61 may hold a certificate revocation list (CRL) and a certificate (CERT-S) for its public key. The facility for generating a time-varying value 42 may comprise a clock for generating a timestamp or other means for generating a time-varying value. The I/O port 63 provides an interface between the processor of the server and external entities.

Figure 3A:
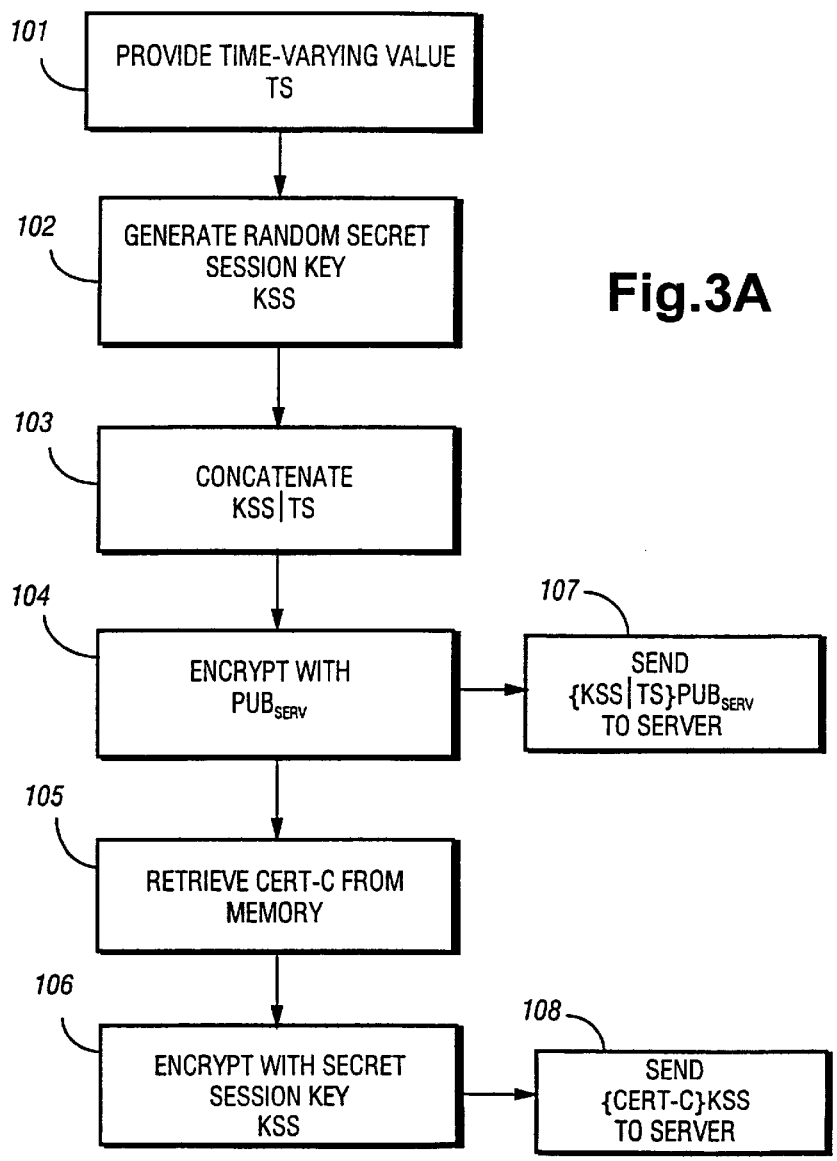
FIG. 3A is a flow diagram showing the procedure for generating messages by a client to prove its authenticity to a server.

FIG. 3A illustrates the processing by a client for generating and sending messages to a server for use by the server to prove the client's authenticity. A client at 101 generates or provides a time-varying value (TS). This may be a timestamp or other value which changes with time. The client also generates a random secret session key (KSS) at 102 employing a number generator or other means to provide a random seed number. At step 103, the time-varying value TS and the secret session key KSS are concatenated and at 104 the result is encrypted with the server's public key $PUB_{SERV}$ which has been retrieved from memory 4 or 5. The encrypted message $\{KSS|TS\}PUB_{SERV}$ is sent to the server at 107. The client's certificate (CERT-C) is retrieved from memory, EPROM 3, at 105, encrypted with the secret session key KSS at 106 to form message $\{CERT-C\}KSS$ which is sent to the server at 108. The sending operations 107 and 108 may be combined into one operation.

Figure 3B:
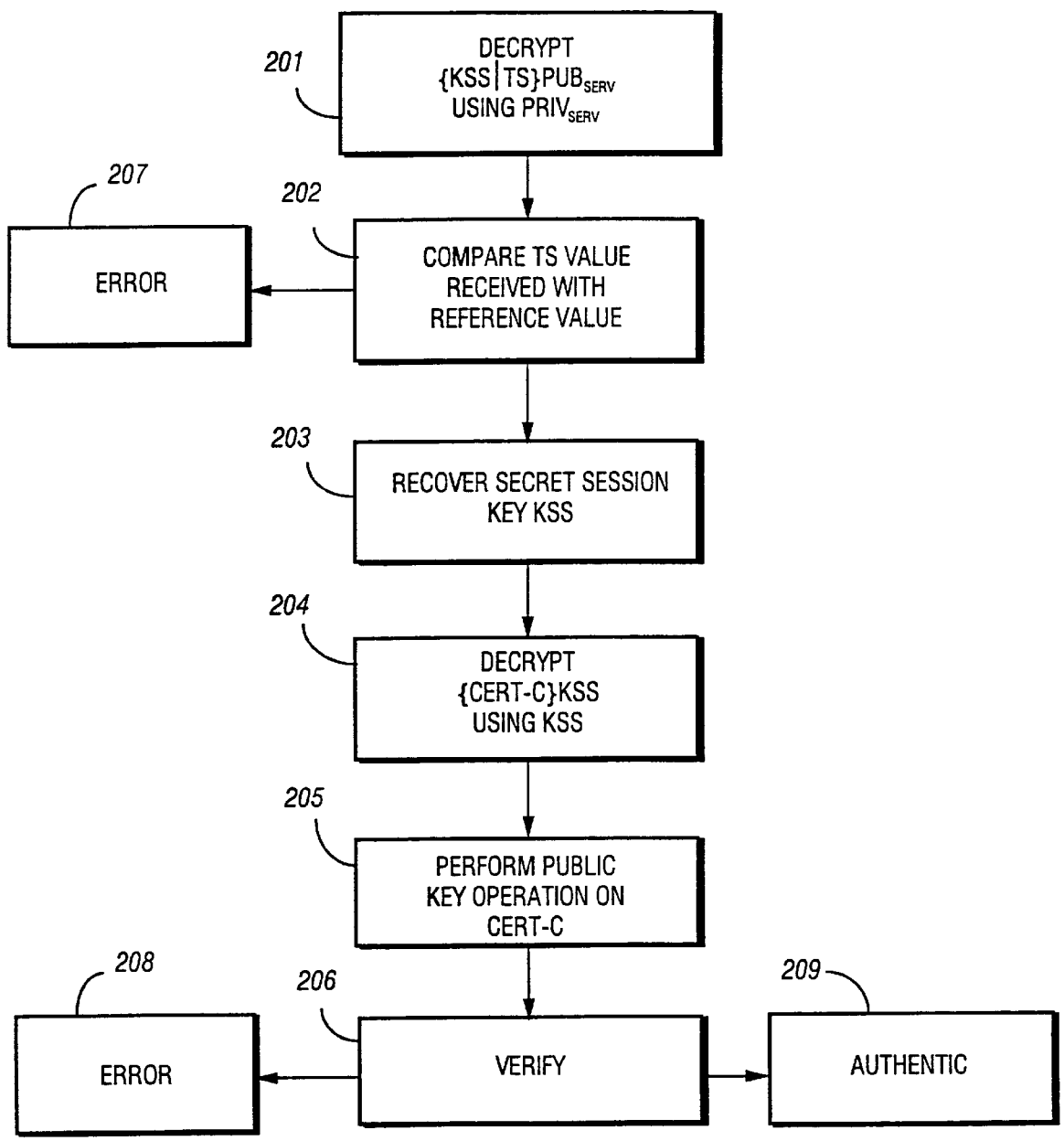
FIG. 3B is a flow diagram showing the processing at the server of messages sent by a client to authenticate the client.

FIG. 3B illustrates the processing at a server 40 of messages received from a client via I/O port 63 for the purpose of ensuring the authenticity of the client. Initially, the server decrypts at 201 the message $\{KSS|TS\}PUB_{SERV}$ using its private key $PRIV_{SERV}$ recovered from memory 61. At 202 the received time-varying value TS is compared with a reference value obtained from the server's facility for generating a time-varying value 42. Where the values do not compare an error signal is generated at 207 and the process is terminated. Where the time-varying values compare, the processing continues at 203 with recovery of the secret session key KSS and at 204 by decrypting of the message $\{CERT-C\}KSS$ using the secret session key. This provides the server with the client's certificate (CERT-C) which is then at 205 subjected to a public key operation using the trusted certification authority's public key $PUB_{TCA}$ retrieved from memory 61. At 206 a verification of the certificate (CERT-C) is performed with the subsequent generation at 208 of an error signal where the certificate cannot be verified or the generating of an authentic signal at 209 where the certificate is found to be authentic. The verification procedure at 206 may include the use of the CRL stored in memory 61.

Figure 5:
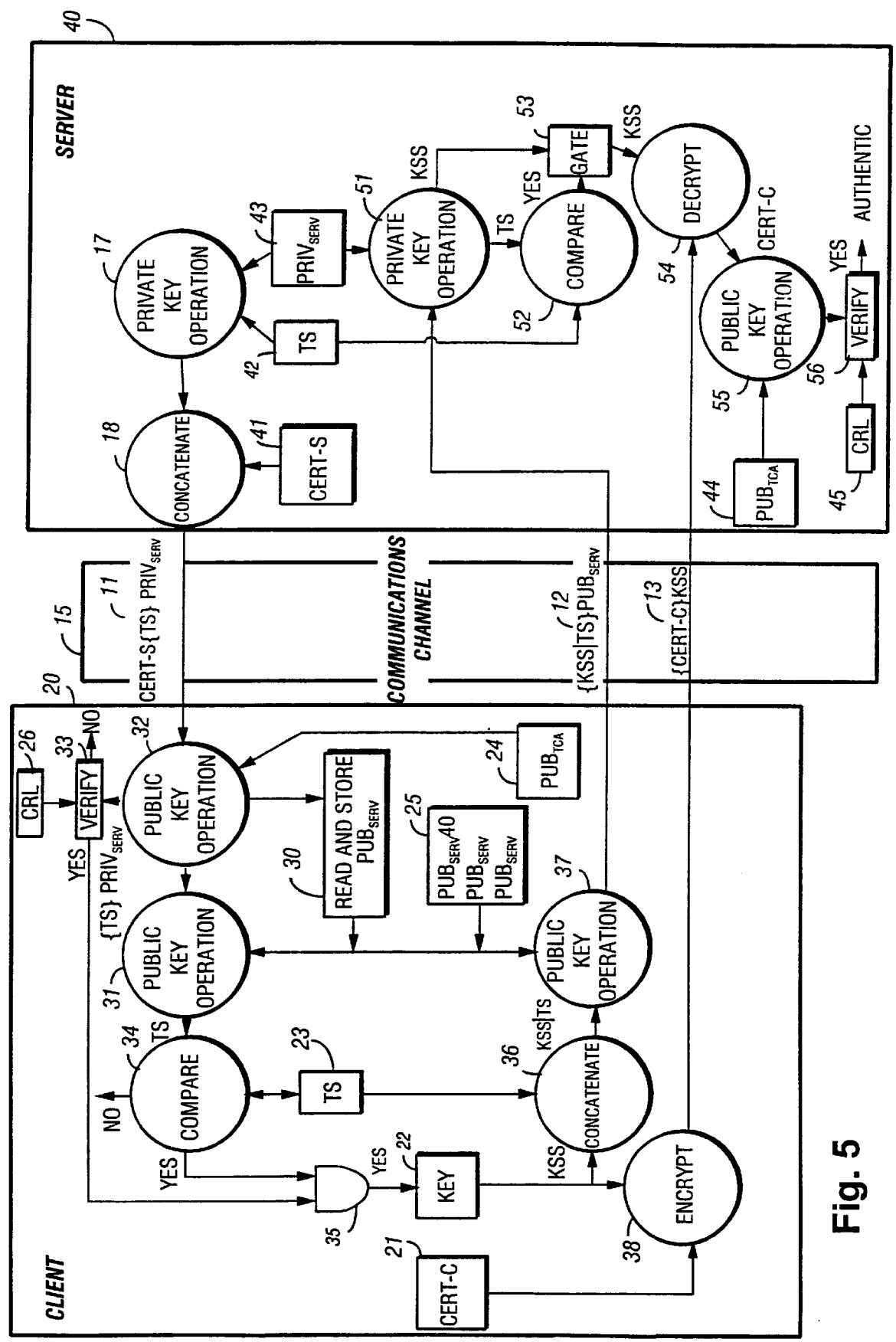
FIG. 5 is a flow diagram illustrating an interactive embodiment of the invention where a client is sent a message signed by the server.
Figure 6:
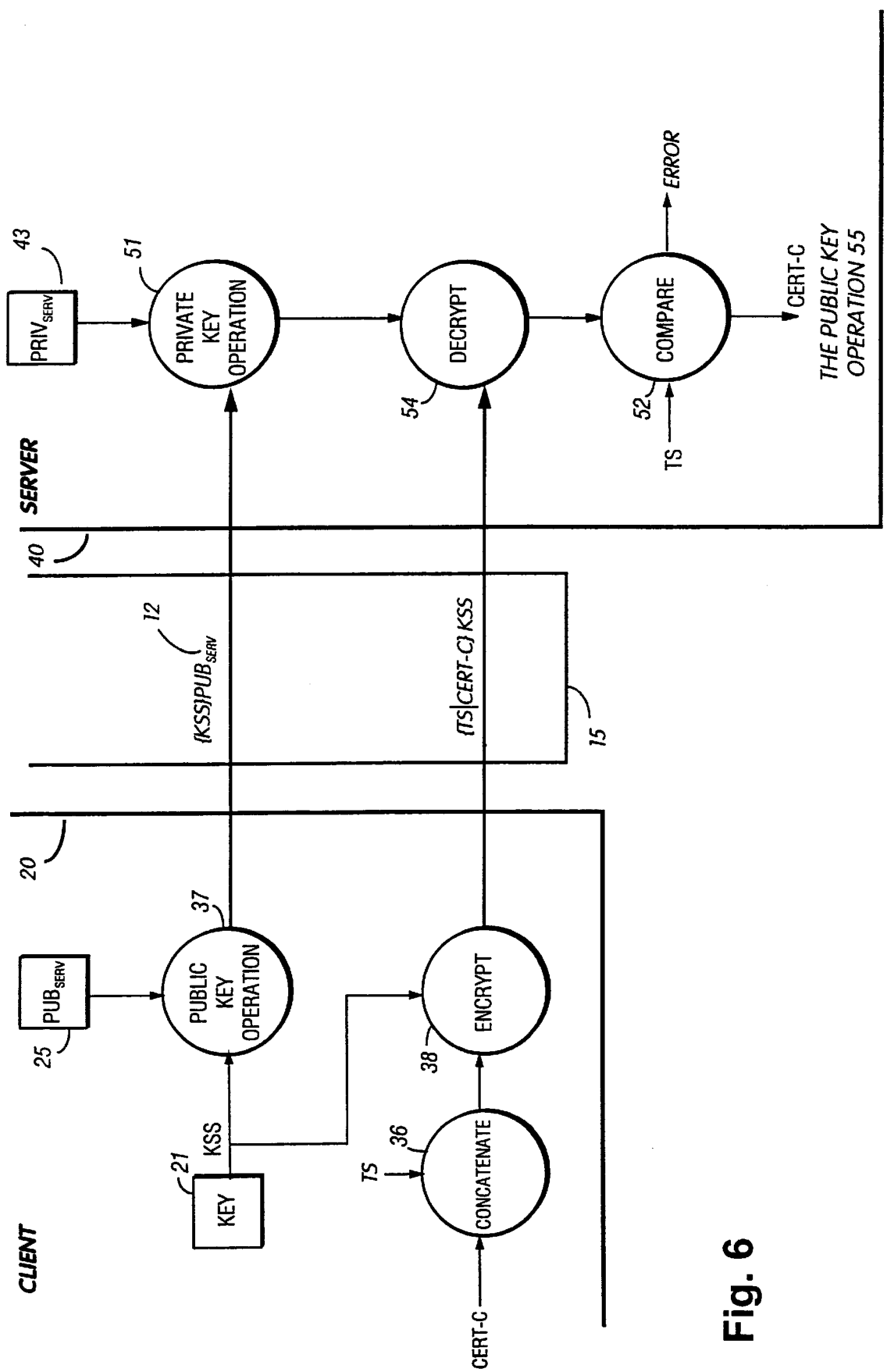
FIG. 6 is a partial flow diagram illustrating a variation in the messages generated by the client.
Figure 7:
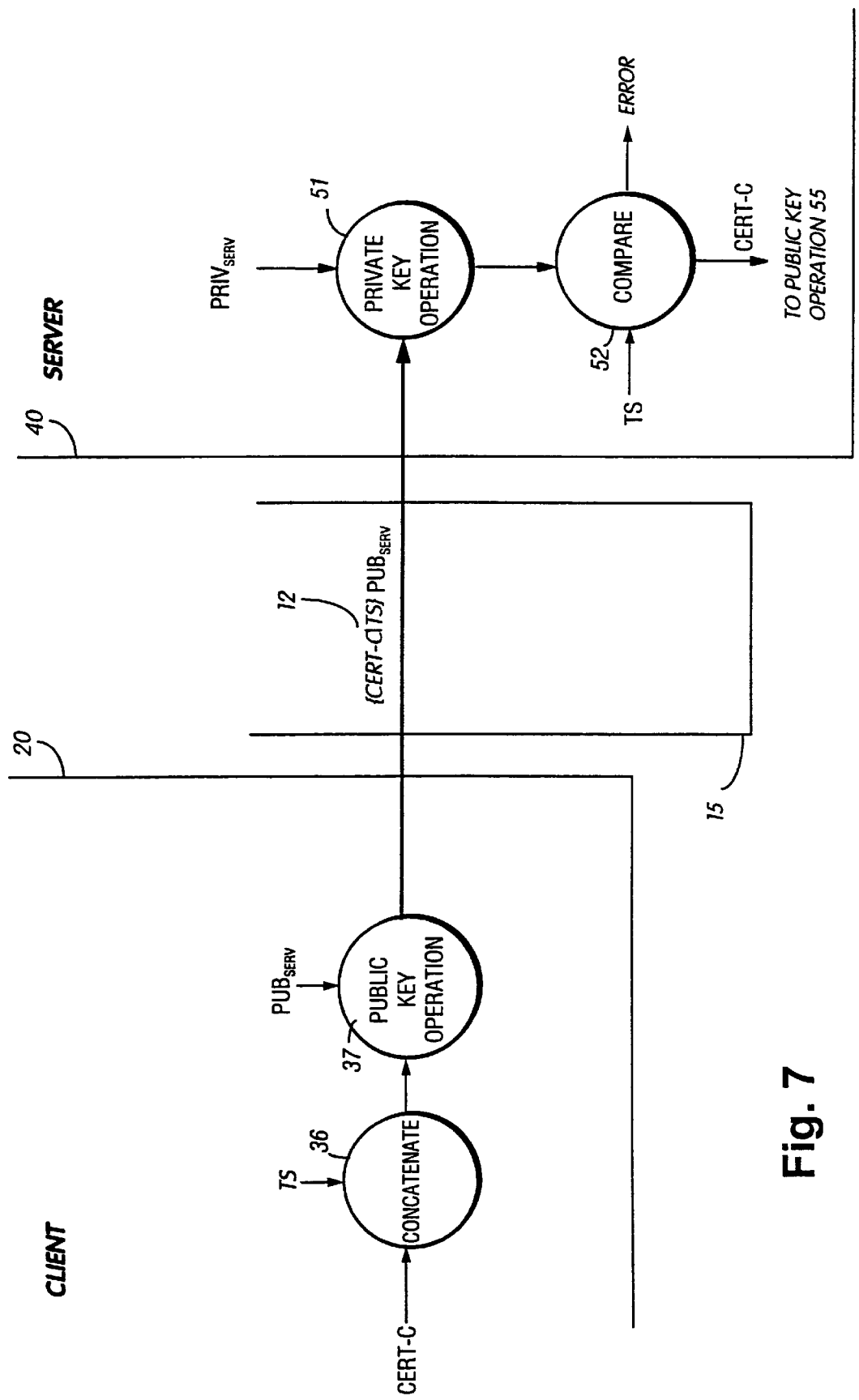
FIG. 7 is a partial flow diagram illustrating a version of the invention where a client's certificate is sent directly to a server.
Figure 8:
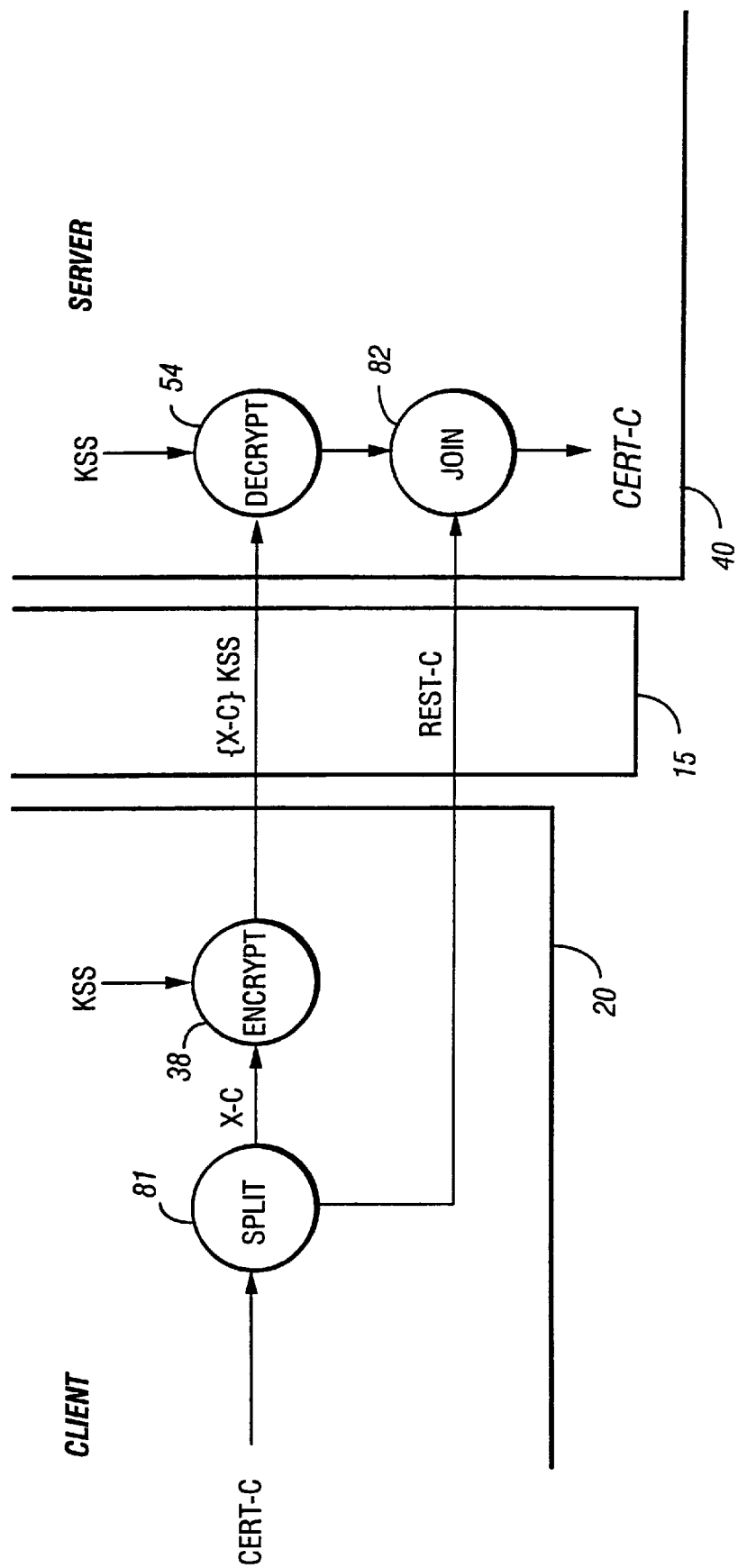
FIG. 8 is a partial flow diagram of FIG. 5 modified so that only part of the client's certificate is encrypted.
Figure 9:
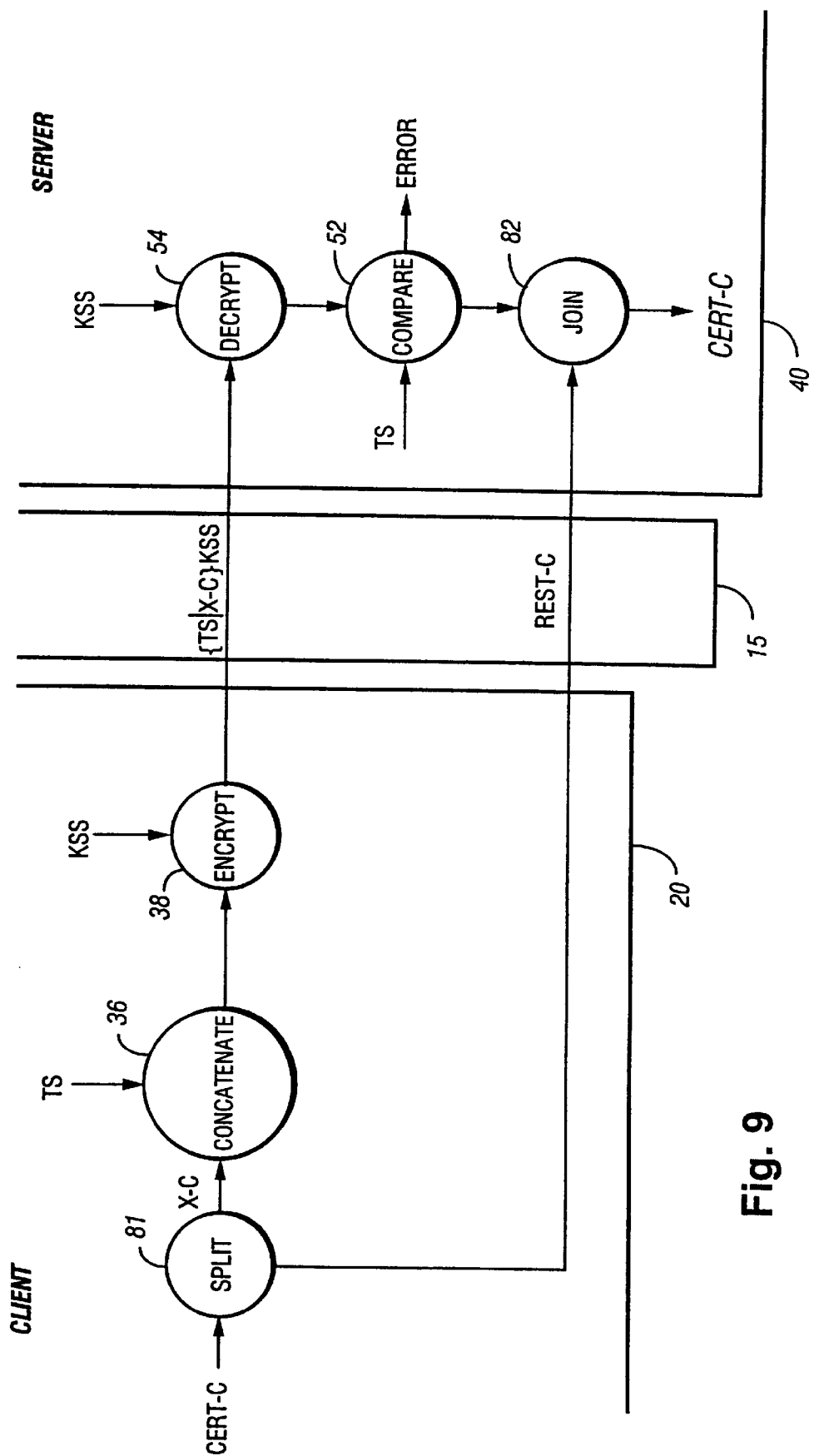
FIG. 9 is a partial flow diagram of FIG. 6 modified so that only part of the client's certificate is encrypted.
Figure 10:
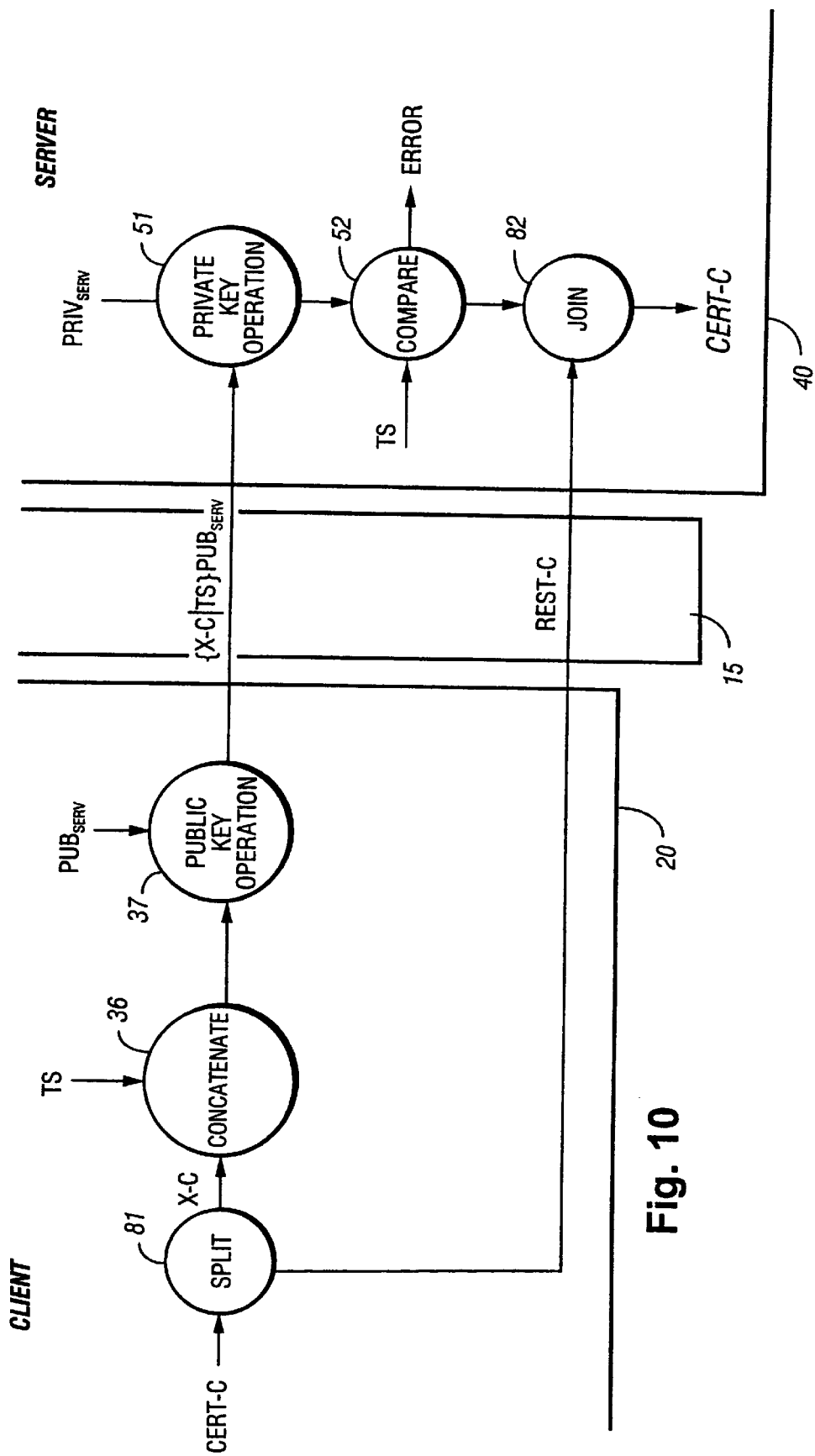
FIG. 10 is a partial flow diagram of FIG. 7 modified so that only part of the client's certificate is encrypted.
Figure 12:
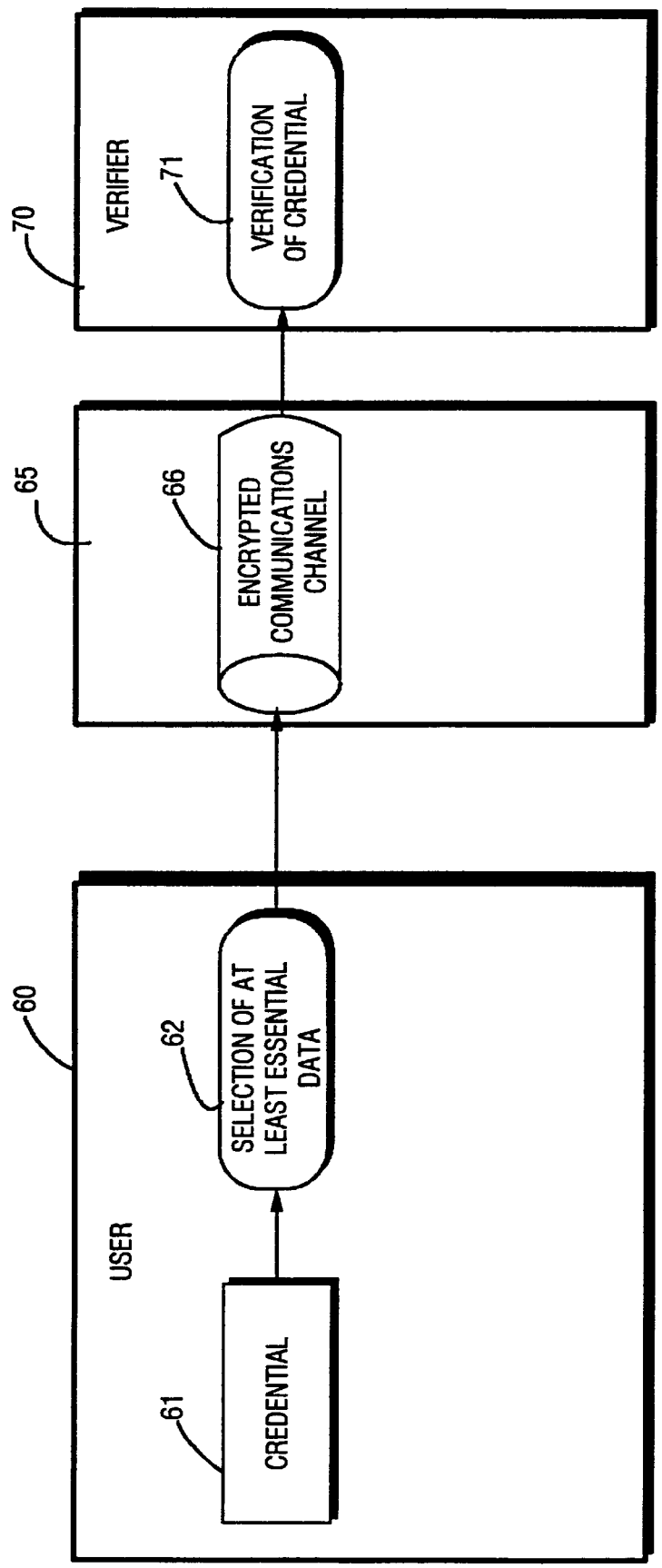
FIG. 12 illustrates a still further flow diagram of essential elements of a system having a more general protocol but which may have features of other embodiments disclosed herein added thereto.

One embodiment of the invention is a non-interactive version where the protocol requires only the sending of messages over a communications channel by a client to the server with which it is seeking to execute a transaction. In other interactive embodiments (FIGS. 4A, 4B and 4C), a message, designated 11 in the drawing figures, containing information needed by the client to produce authenticating messages for the server, e.g., the public key of the server and/or a time-varying value provided by the server, is sent by the server to the client. In a further interactive embodiment (FIG. 5), the client has need of assurance of the server's presence in the transaction and therefore requires a message signed by the server. FIG. 6 represents a modification of the embodiments of the invention due to the message generated by the client having the time-varying value combined with the certificate of the client. FIG. 7 shows a version of the invention where a session key is not used. Moreover, FIGS. 8 to 10 illustrate modifications to the embodiments of FIGS. 5 to 7 wherein only a part of the client's certificate is encrypted. Additionally, FIG. 12 illustrates a fundamental protocol whereby a user can confidentially deliver to a verifier information which is essential to verify a message signed by a credential issuing authority, but which may be modified to include one or more features of other disclosed embodiments.

In the non-interactive embodiment, there is no message 11 sent from server 40 to a client in the authentication protocol. The protocol is essentially as shown in FIGS. 3A and 3B with a client configuration as in FIG. 1 and a server configuration as in FIG. 2. The client upon gaining access to a server 40 obtains the server's public key from a local storage, generates a random secret session key KSS (102), concatenates (103) it with an internally generated time-varying value, encrypts (104) the result with the server's public key and sends the result to server 40 (107). The client concurrently or subsequently retrieves its certificate (CERT-C) from storage (105) encrypts (106) the certificate with the secret session key and sends the result to server 40 (108). In the non-interactive embodiment, there is no signing by the server or even the generation and sending of a message by the server. The client's confidence in the server is assured by the use of the server's public key, since only the server can decrypt a message encrypted with its public key. The authenticity of the client is established to the satisfaction of the server by its receipt and verification of the time-varying value and the client's certificate by processing the received messages in accordance with the procedure shown in FIG. 3B.

Figure 4A:
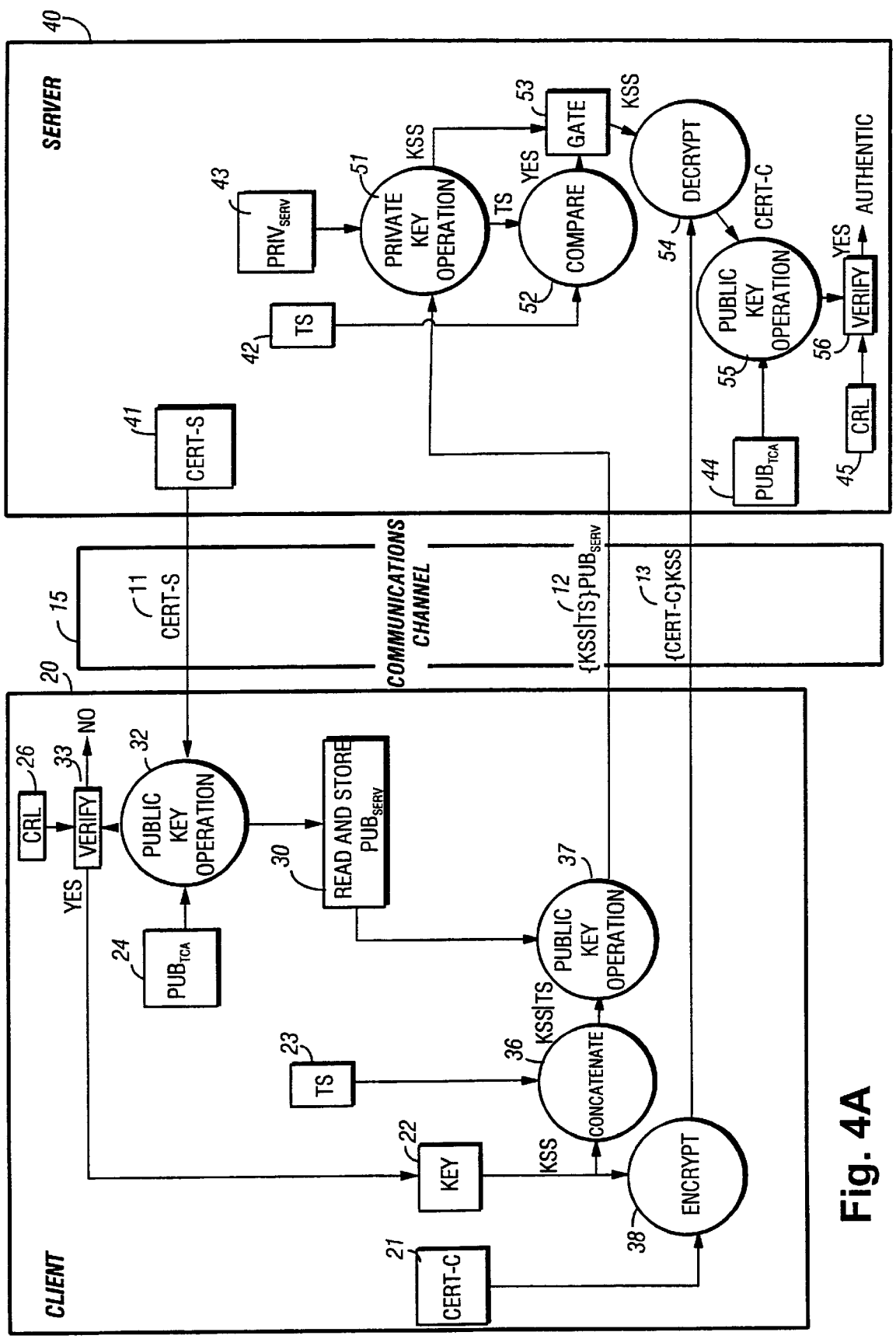
FIG. 4A is a flow diagram illustrating an interactive embodiment of the invention where the server sends a copy of its certificate to a client.
Figure 4B:
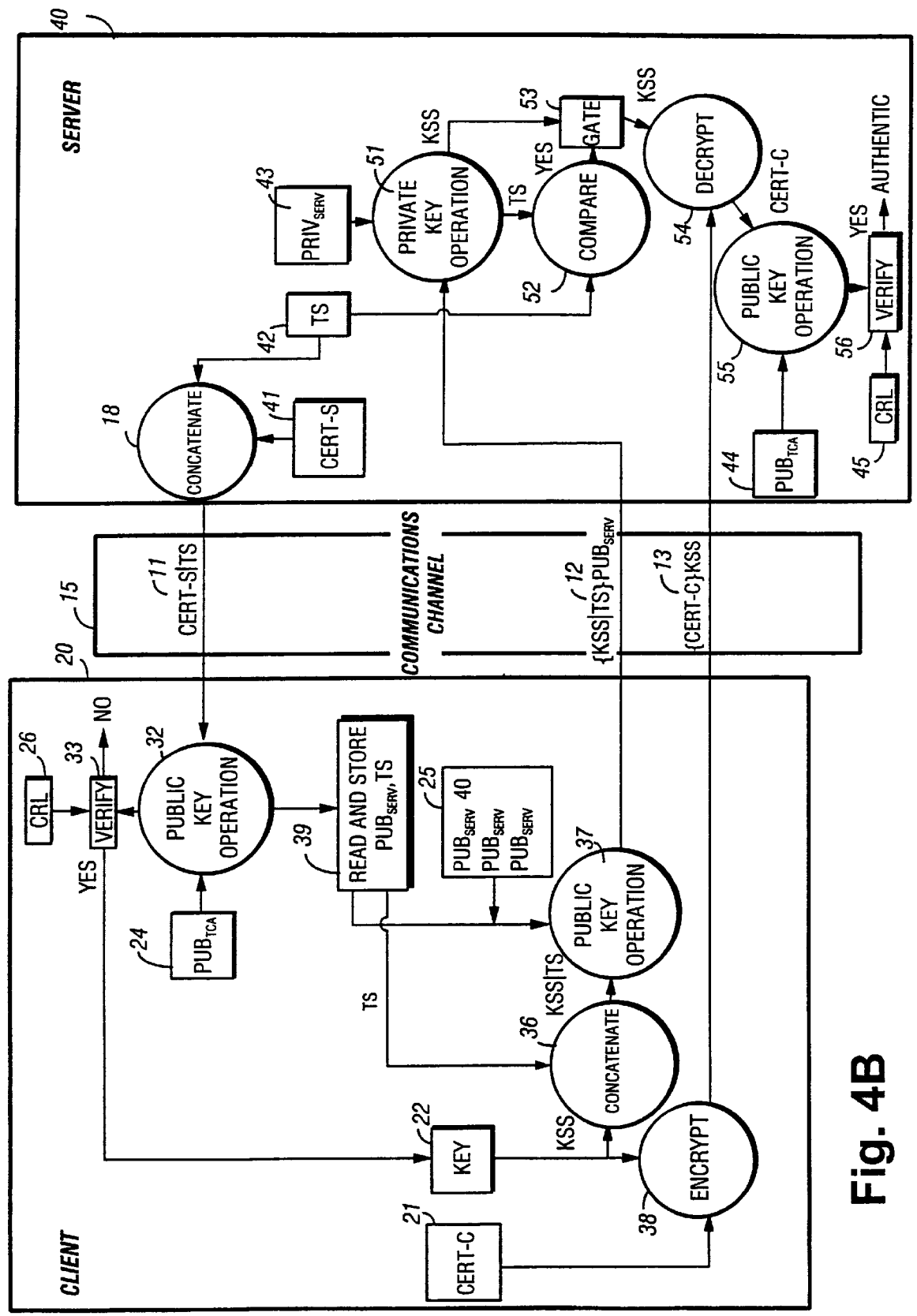
FIG. 4B is a flow diagram illustrating an interactive embodiment of the invention where the server sends a copy of its certificate and a time-varying value to the client.
Figure 4C:
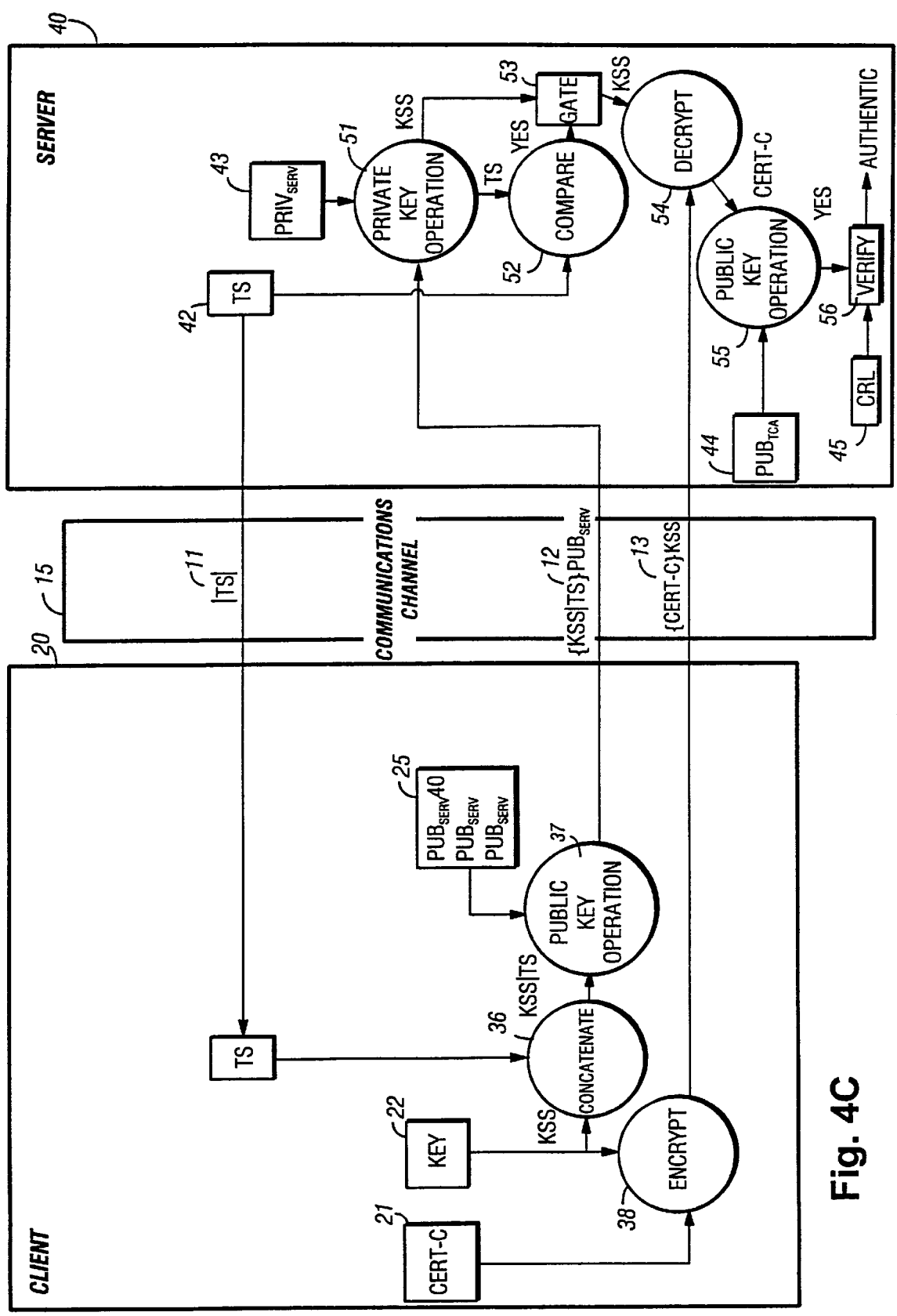
FIG. 4C is a flow diagram illustrating an interactive embodiment of the invention where the server sends a time-varying value to the client.

In the interactive embodiments of FIGS. 4A, 4B and 4C, message 11 consists of a certificate (CERT-S), a time-varying value, or a combination of a certificate (CERT-S) and a time-varying value. These informational items are provided to a client so that the client may properly form authenticating message 12. FIG. 5 shows an interactive embodiment where the server provides a signed message 11. Since FIG. 5 is the most comprehensive, it will be described first, and the embodiments of FIGS. 4A, 4B and 4C described primarily with respect to differentiating features caused by the differences in the content of message 11.

In FIG. 5, the parties to the electronic transaction are the client 20 and the server 40. Messages 11, 12 and 13 are generated and exchanged between the client 20 and the server 40 over a communications channel 15.

Successful exchanges of the messages establish the trust of the client 20 in the server 40 and the authenticity of the client 20 to the server 40. Communications channel 15 may simply be electrical connections between a card reader and the terminal equipment at a server or may be in the form of a telephone or other communications link established between a client and a remote server, or other conventional communications medium.

Client 20 includes a certificate (CERT-C) 21 stored in EPROM 3, a key generator (KEY) 22, a facility for generating a time-varying value (TS) 23 which may include the clock 8, when used, and the public key ($PUB_{TCA}$) 24 of the trusted certification authority which may be stored in EPROM 3 or PROM 4. Certificate 21 comprises a message provided and signed by the trusted certification authority with its private key in the standard manner. The message in this instance need not be the client's public key because this key is not involved in the protocol. Any message is sufficient and may be certain well structured information about the client, e.g., account number and expiration date of the account. The message may also indicate the types of transactions for which the client 20 is authorized and the period of time during which the certificate may be considered valid. The key generator 22 is comprised of any conventional means of generating an encryption key. It may comprise a subroutine in the processor and use a number supplied by a number generator 7. The facility 23 may comprise conventional clock 8 that provides a current date and time or may be one that operates on a received timestamp or time-varying value. Key 24, the public key of the trusted certification authority, is used to verify a certificate sent by the server and signed by the trusted certification authority.

Key storage unit 25 represents an optional memory or memory section for storage of keys of one or more frequently used servers. These are the public keys of servers and are made available to clients by the servers. Storing the public key of server 40 and other selected servers at the client avoids the need to process the certificate from a server to recover the key, or provides a source for the key where the certificate does not contain the public key or an easily recoverable copy of the public key of the server. CRL storage unit 26, also an optional memory or memory section, stores a list of certificates that have been revoked.

Elements 30 through 35 illustrate the functional processes of the protocol performed by the client to establish trust in the server. Public key operations are conventional well known processes in the art. Recovering the public key of the server from the server's certificate for the key and storing it in a memory, as illustrated in block 30, is a certificate processing within the skill of art.

Functional element 32 represents a public key operation performed with the trusted certification authority's public key 24 on the certificate portion of the message 11 received from the server 40. Functional element 31 represents a public key operation performed on the timestamp or other time-varying value received from a server with the server's public key obtained from processing the certificate at read and store element 30 or from key storage unit 25. At functional block 33 a standard verification procedure, as those skilled in the art appreciate, is used to verify the certificate. A certificate revocation list supplied from memory 26 may optionally be used in verifying the certificate.

Functional element 34 represents a comparison and verification of the timestamp or time-varying value received from the server 40 to verify that it is proper. Where the smart card or client has a clock, a simple comparison (allowing for small time differences) of the time at clock 8 with the time of the received timestamp suffices to verify a received timestamp. Where the smart card does not include a clock, the stored time of a last received valid timestamp can be compared with the time of the currently received timestamp to verify that the currently received timestamp is later in time. Any time-varying value may be received and processed to verify that it is of recent origin or in a proper time sequence.

Failure to verify the server's certificate or time-varying value (illustrated by the NO outputs of elements 33 and 34) results in an error and termination of the transaction. Symbol 35 is a representation that permits further processing, i.e. the generation of the secret session key, when both the received certificate and time-varying have been verified (indicated by YES outputs of elements 33 and 34).

Elements 36, 37 and 38 illustrate the functional processes performed by the client 20 to generate messages 12 and 13. Message 12 is generated by concatenating the session key 22 and the time-varying value from facility 23 at element 36 and performing a public key encryption on the combination in public key operation 37 with the public key of server 40 retrieved from read and store element 30 or key storage unit 25. Message 13 is generated by performing an encryption at element 38 on the certificate 21 with the session key 22.

The functional elements and blocks of client 20 define operational steps performed by a processor, e.g., processor 2 of FIG. 1. Similarly, the functional elements and blocks of server 40 illustrate operational steps performed by the server's processor 60.

Server 40 of FIG. 5 includes a certificate (CERT-S) 41 provided by the trusted certification authority, a facility for generating time-varying values (TS) 42, the private key of the server ($PRIV_{SERV}$) 43 and the public key of the trusted certification authority ($PUB_{TCA}$) 44. Certificate 41 is a certificate for the server's 40 public key, and contains a message which includes the server's public key and that identifies the server as a valid and authorized holder of the public key. Facility 42 may be provided by a clock. The key 43 is the server's private key of the public key/private key pair used in standard public key cryptography. Key 44 is the public key of the trusted certification authority. CRL 45 is an optional element that stores certificate revocation lists for both server's and client's certificates. These lists are signed, dated messages received from the trusted certification authority. The server CRL is for forwarding to a client during the herein described protocol or ancillary to the protocol. The client CRL would serve, for example, as a list of revoked smart cards, i.e., cards that have been lost, stolen, destroyed or that have expired.

The server's certificate and private key, the public key of the certification authority and the CRL are stored in memories of the server. These memories are accessed by a processor of the server in accordance with an operating procedure for executing the authentication protocol.

Elements 17 and 18 illustrate the functional process for generating message 11. The time-varying value from facility 42 is signed with the private key 43 of the server 40 in private key operation 17. The signed time-varying value is then concatenated with the certificate 41 in the concatenate operation 18 to thereby form message 11.

Blocks and elements 51 through 56 represent functional processes of the protocol performed by the server 40. Functional element 51 performs a private key operation with the private key 43 on the received message 12. A comparison at 52 provides verification of the time-varying value received from the client 20. This may be done by comparing a timestamp received with the current timestamp of a clock from facility 42, or by storing a time-varying value sent to the client and comparing the stored time-varying value with the time-varying value returned by the client to see that they are in correspondence. Gate symbol 53 represents the permissive continuation of the processing upon the verification of the receipt of a proper time-varying value. Functional element 54 performs a decryption of the message 13 using a key 22 received from the client 20. Functional element 55 performs a public key operation on the certificate with the public key 44 of the trusted certification authority. Block 56 provides for the verification of the certificate with or without the CRL of clients in a manner well understood by those skilled in the art.

Initially, the client 20 may have to gain the trust of the server 40 before it will reveal its certificate 21. This protects against revealing the certificate to unauthorized third parties who could then use the certificate to impersonate client 20. Client 20 gains the trust of the server 40 through a public key protocol.

Considering the FIG. 5 illustration, so that client 20 may gain its trust, upon a request for access the server 40 reveals its certificate 41 by combining the certificate 41 with the signed time-varying value from facility 42 to form message 11 CERT-S{TS}$PRIV_{SERV}$. Client 20 receives the message 11 sent over the communications channel 15, verifies the signature on the certificate with the trusted certification authority's public key 24 in public key operation 32 and verification process 33, and processes the certificate in operation 30 to read and store the public key of the server. Client 20 then uses the public key of the server in public key operation 31 to obtain the time-varying value. As indicated above, the public key of server 40 alternatively may be retrieved from public key storage unit 25 where used. Checking of the time-varying value to see that it is valid is done in comparison unit 34. A failure to verify the server's certificate or validate the received time-varying value terminates the transaction. Signature verification, particularly for RSA, is computationally inexpensive, so the computational burden on the client 20 is minimal. As an additional step in certificate verification, the client 20 may check the values of one or more fields of the certificate 41 to determine whether the server 40 is authorized for transactions with the client 20. It is presumed that the trusted certification authority of interest issues authorized certificates only to trusted servers, so the pair of signature verifications is sufficient for the client 20 to gain trust in the server 40.

Once client 20 verifies the time-varying value from 42 and the certificate 41 of server 40, trust of the server 40 is established. Thereafter, client 20 generates a random secret session key (KSS) at 22, combines this key with its time-varying value (TS) generated by a clock at 23, or where no clock is present replicates the time-varying value received from the server, to form a message and encrypts the message with the public key ($PUB_{SERV}$) of server 40 obtained from storage at element 30 or 25 to form the encrypted message 12. Again, for RSA, encrypting with the server's public key is computationally inexpensive so this is not a burden on the client.

The encrypted message 12, {KSS|TS}$PUB_{SERV}$, is sent to the server 40 where it is received and processed for recovery of the secret session key KSS by decrypting the message 12 with private key 43 in private key operation 51. A checking of the time-varying value TS demonstrates to the server 40 that a client is active in the transaction, not an impersonator replaying a recorded message.

Client 20 then encrypts its certificate 21 using the secret session key to produce encrypted message 13, {CERT-C}KSS, and sends it to server 40. Messages 12 and 13 may be combined as one message {KSS|TS}PUB$_{SERV}${CERT-C}KSS. Server 40 receives the encrypted message 13 and decrypts it in decryption operation 54 to gain the client's 20 certificate 21. Certificate 21 is processed in public key operation 55 with the trusted certification authority's public key stored at 44. After verification at 56, with or without the optional CRL in unit 45, the authenticity of client 20 is accepted by server 40 and the transaction can be undertaken.

When clocks are used for both timestamp facilities, the client and the server need to account for variations in their clocks when checking that the timestamp received is current. One procedure is to determine the difference between the two clock timestamps, for example, the client determines the difference between the received timestamp and its own clock generated timestamp, and compares that difference to a pre-set reference value to see that it is less than the reference value. Other techniques known to those skilled in the art may be used to account for the clock variations. See, for example, Weiss, U.S. Pat. No. 4,885,778, entitled "Method and Apparatus for Synchronizing Generation of Separate Free Running, Time Dependent Equipment," which describes a technique for synchronizing client and server clocks in an authorization protocol.

In place of a timestamp a challenge may be used. A challenge may comprise any-time varying message that can be processed and verified.

The client may also store a CRL of servers. Either as a part of the authentication protocol or subsequent thereto, the server and the client may exchange lists of revoked certificates.

In the embodiment illustrated in FIG. 4A, message 11 consists of the public key certificate 41 of server 40. Here, client 20 does not have or need to have prior possession of the server's public key. Possession of the server's public key is acquired by the client receiving and reading the public key certificate 41. The signature on the certificate is verified with the Trusted Certification Authority's public key 24 and the certificate is verified by conventional verification procedures as discussed in the description of FIG. 5. This public key of the server is then used in public key operation 37. The time-varying value is generated locally at facility 23. As seen from FIG. 4A, client 20 comprises only the elements, e.g., 24, 32, 33 and 26 to verify the certificate and its signature and a functional element 30 to read the received certificate 41 and store the public key PUB$_{SERV}$. The server's processing to form message 11 involves only the sending of its certificate 41. The remainder of the components, functional elements and operations of FIG. 4A correspond with those in FIG. 5.

In the embodiment of FIG. 4B, the message 11 consists of certificate 41 and a time-varying value TS. The time-varying value TS is needed where a client 20 does not have a facility for generating its own time-varying value. Thus, as shown, server 40 forms message 11 by concatenating at element 18 the certificate 41 with the time-varying value from facility 42. In FIG. 4B, client 20 verifies via 24, 32 and 33 the signature on the certificate, optionally via 26 the revocation status of the certificate and at functional element 39, reads and stores the server's public key and the time-varying value sent by the server. The time-varying value is processed and replicated or modified for use in forming message 12. This embodiment is advantageous since its implementation requires few structural components and computational operations. The client simply obtains the value TS and public key of the server needed for generating message 12 from the server. The server then processes the messages received as in the previously described embodiments. When a timestamp is not used by the server as the time-varying value, neither the server or the client needs a clock. Public key storage element 25 is optional.

In FIG. 4C, message 11 consists of a time-varying value TS. As previously described, client 20 may have no clock or timestamp facility. It therefore has to receive a time-varying value at facility 23 or the like. Again, the received time-varying value may simply be replicated, or modified in a predetermined manner, and returned to server 40 in message 12. This assures the server that a current transaction is taking place. Again, neither party needs a clock. However, the client has to have a stored copy of the public key of server 40, i.e., an element 25 of memory 4 with a stored copy of the public keys of various servers with which it will interact. Server 40 only requires the message generating elements necessary to send a time-varying value. The remaining elements depicted in FIG. 4C are like those in FIG. 5 and operate in a similar manner.

The content of the messages generated and sent by a client to a server may be as shown in FIG. 6. Here the time-varying value is concatenated with the certificate of the client instead of with the secret session key. As shown, client 20 in public key operation 37 encrypts the secret session key with the server's public key, the server's public key being produced as in any of the previously described embodiments, concatenates at 36 the time-varying value, obtained as in any of the previously described embodiments, with the client's certificate (CERT-C), and encrypts at 38 the result using the secret session key. The processing in the server is modified to accommodate the change in the messages 12 and 13, causing the time-varying value verification to be subsequent to the decrypting at 54. The server decrypts message 12 using its private key to recover the session key and decrypts the time-varying value|certificate with the secret session key. The certificate is subjected to a public key operation and verifying procedure as in elements such as 55 and 56 as shown in the FIG. 5 embodiment. The variation shown in FIG. 6 may be practiced with any of the embodiments hereinbefore described.

In some instances a session key in not used, as for example where the subsequent communications of the overall transaction session are not encrypted. The client's certificate is simply concatenated with a time-varying value and the result is encrypted with the server's public key to form the message 12 which is sent directly to the server. FIG. 7 shows, in part, a protocol that does not use a session key. The client 20 concatenates at 36 a time-varying value produced as in any of the previously described embodiments, and encrypts at 37 the result with the server's public key obtained as in any of the previously described embodiments. Server 40 decrypts the message at 51 with its private key, verifies at 52 the time-varying value, and processes the client's certificate as hereinbefore described to authenticate it. A smart card using this protocol may only comprise a processor, a memory storing the certificate for the card and the public key of servers and a facility for providing a time-varying value. The smart card may then engage in a non-interactive protocol with a server for the purpose of establishing its authenticity to a server. In an interactive protocol, the server in a communication to the client provides a time-varying value and its public key certificate as in FIG. 4B, and the smart card processor processes the receipt of same to produce a time-varying value and the public key of the server. The other interactive embodiments of FIGS. 4A and 4C and FIG. 5 may also be modified to have no session key.

It is also possible to modify the aforementioned embodiments to encrypt only part of the certificate, which may lead to greater efficiency in the protocol. For instance, the client can encrypt only the signature on the certificate, transmitting the rest of the certificate unencrypted. Since a certificate is not valid without a signature, an opponent who obtains only the non-signature part of the certificate will not be able to impersonate the client.

As a generalization, the client can encrypt any data essential to the verification of the certificate. The signature is one example; another example is a part of the signature, large enough so that the opponent cannot guess it. A third example is a secret certificate serial number assigned by the certification authority. In general, the most efficient approach, in terms of communication requirements, is to encrypt something that is already required by the server, rather than something new. Since the signature is already required, it is a natural choice, though other parts of the certificate may be appropriate as well.

In some cases, it may be more efficient in terms of communication bandwidth to encrypt more than just the data required to verify the certificate. For instance, if the encryption is performed with the public key of the server, then the client can encrypt as much additional data as can be encrypted with a single public-key encryption operation. The approach of encrypting the entire certificate is an extreme example. As another variation, it is possible to encrypt part of the certificate with a public-key encryption, and part with a secret-key encryption.

FIG. 8 illustrates in part a variation of the embodiment of FIG. 5 wherein only a portion of the certificate 21 is encrypted and transmitted to the server 40 with the remainder of the certificate (REST-C) being transmitted in unencrypted form. Thus, the certificate 21 can be split at 81 so that any data in the certificate which is essential to the verification of the certificate is split and subsequently encrypted by secret session key (KSS) at 38. The remainder of the certificate (REST-C) is transmitted unencrypted to the server 40.

Upon receipt of the transmitted encrypted and nonencrypted portions of the certificate the server 40 decrypts the former at 54 and joins the latter at element 82 so as to obtain the client's certificate 21. Thereafter as illustrated in FIG. 5, the certificate is processed in public key operation 55 with subsequent verification at 56. As previously noted, the encrypted portion (X-C) of the client's certificate may be any portion which is sensitive or essential to the verification of the certificate such as the signature or a portion of the signature.

FIG. 9 is an illustration of a variation of the embodiment of FIG. 6 wherein only a portion (X-C) of the client's certificate 21 is encrypted with the remainder (REST-C) being transmitted in unencrypted form. In this regard the certificate 21 is again split at 81 to obtain an essential portion (X-C) of the certificate. Thereafter, as may be seen from FIGS. 9 and 6, the essential portion of the certificate is concatenated at 36, encrypted at 38 and transmitted to the server 40. Moreover, the unencrypted portion (REST-C) of the certificate 21 is transmitted to the server 40 for joining at 82 with the decrypted portion (X-C) for subsequent verification of the client's certificate 21.

FIG. 10 illustrates a variation of FIG. 7 wherein only an essential portion of the client's certificate 21 is encrypted with the remainder of the certificate being transmitted unencrypted. More specifically, the certificate 21 is split at 81 to form an essential portion (X-C) which is concatenated and encrypted at 36 and 37, respectively, for transmission to the server 40. Meanwhile, the rest of the certificate (REST-C) is transmitted to the server in unencrypted form for joining at 82 with the essential portion of the certificate as decrypted at 51 and 52 to thus provide the server with the client's certificate.

Another approach applies when the certificate contains a field that is computed as the one-way function, such as a cryptographic hash function, of a secret value. In this case, the secret value is encrypted and transmitted to the server, and the server computes and compares the one way function of the received secret value to the field in the certificate, after verifying the certificate. This has the advantage that the secret value can be concealed from the certification authority during the process of obtaining a certificate, so that the certification authority cannot later impersonate the client. The approach of encrypting a secret data value whose one-way function value is contained in the certificate has this property. A related approach is described in the Secure Electronic Transaction Specification (MasterCard and Visa, Jun. 24, 1996). In SET, the name field in a certificate is formed as a one-way hash of the account number and other information, and during a purchase protocol, the account number and the other information are encrypted and transmitted to a server, which compares their hash to the name field of the certificate. However, authentication in SET is also based on digital signatures, as in other conventional approaches. The account number itself is concealed for the protection of the account owner, not primarily for authentication, and it is not concealed from the certification authority.

Related to this, there could be a hash-tree of secret values whose root is included in the certificate, where a path through the tree is encrypted and transmitted to the server. The hash-tree variation provides greater protection against misuse by the server, since different paths could be associated with different servers. Here it is important to note that the path is encrypted. However, in a different approach based on a hash tree, the root is included in the certificate and a digital signature, which need not be encrypted, is formed with the tree. See, for example, Merkle, U.S. Pat. No. 4,309,569, entitled "Method of Providing Digital Signatures." In this regard, the storage requirement for the latter approach is quite large and may be impractical in a smart card or similar processor.

Figure 11:
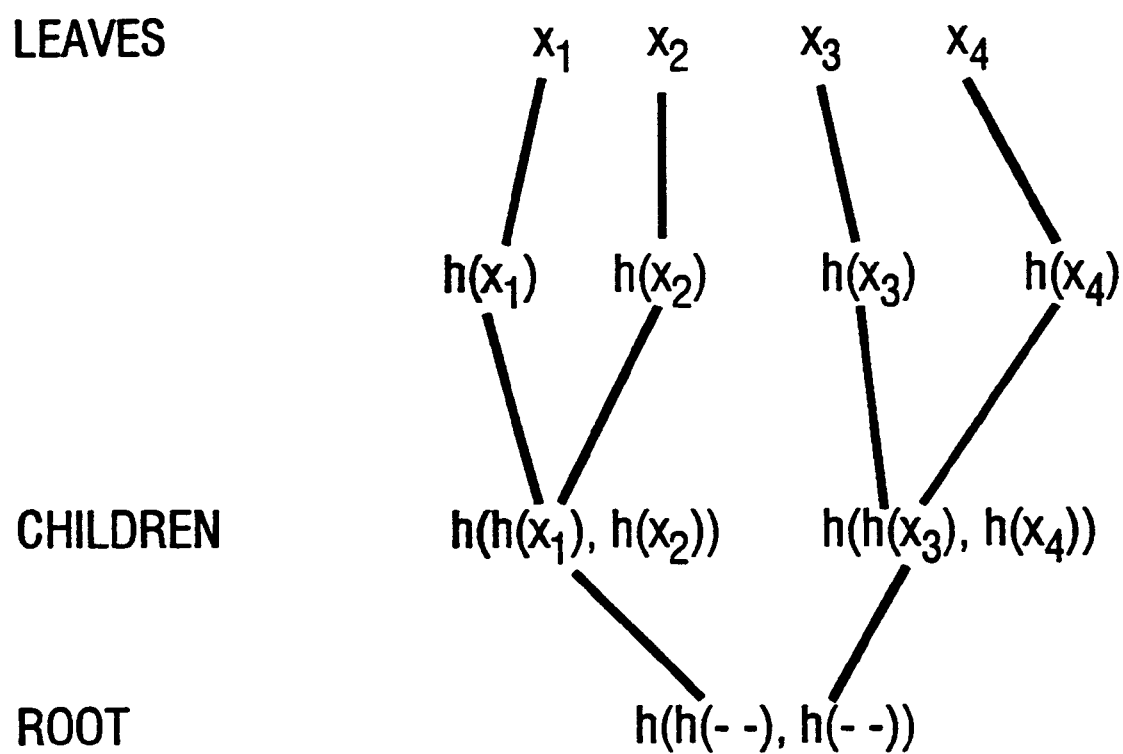
FIG. 11 is an illustration of a hash tree which may be used to prevent misuse by a server.

Regarding hash trees, as may be seen in FIG. 11, a hash tree consists of a root and one or more children, where if there is more than one child, each child must be a hash tree, and if there is only one child, the child is a leaf. A leaf has no children. A hash tree thus consists of many leaves, connected to the root through intermediate nodes. Each leaf has a predetermined value. The value of a hash tree is the hash of the values of its children and the value of a hash tree is thus computed recursively.

A path through a hash tree consists of a leaf and the values of the siblings of its successive parents. A path is verified by recalculating the value of the root based on the values in the path. This can be done recursively, since the value of each child of the root is either in the path, or can be recalculated from the rest of the path. As may be seen in FIG. 11, the path from $X_3:X_3$, $h(X_4)$, $h(h(X_1)$, $h(X_2))$ can be verified by recalculating the root given the values of siblings in the path.

Only one leaf is contained in a path, and provided that the hash function is one-way, the values of leaves not in a given path cannot be determined from the path. Thus, it is possible to reveal paths for each leaf in the tree such that a different path is used for each verifier, so as to prevent misuse. Only the root needs to be trusted initially by a verifier. It should be noted that the previously mentioned approach of storing the hash of a secret value in the certificate is really just a special case of a hash tree, where there is only one leaf.

In the above described protocols, the server 40 can easily recover the certificate sent by client 20 but no third party can because only client 20 and server 40 know the secret session key and/or only the server knows its private key. The server 40 is convinced that the client 20 is authentic and active in the transaction. Client 20 is assured that its certificate is seen only by server 40. While server 40 has enough information after a transaction to impersonate client 20, server 40 is of such integrity as to be trusted not to reveal the client's certificate to any third party or to impersonate client 20.

Trust of server 40 is a realistic consideration since servers are currently trusted to not reveal passwords or other data belonging to a client. In financial applications, the server (card reader) is trusted not to reveal account numbers or a personal identification number (PIN). Thus, it is reasonable to assume that the server or card reader will not reveal certificates.

In the case of RSA, the encryption and signature operations can follow the techniques described in PKCS #1: RSA ENCRYPTION STANDARD (RSA Laboratories, November 1993), in *International Standard 9796: Information Technology, Security Techniques: Digital Signature Scheme Giving Message Recovery (ISO/IEC,* 1991), in M. Bellare and P. Rogaway, *"Optimal Asymmetric Encryption"* in Advances in Cryptology-Eurocrypt '94, pp 92–111 (Springer-Vertag (New York 1995)) or in similar standards, as are well known to those familiar with RSA.

The client and server certificates may be signed by the same trusted certification authority or different trusted certification authorities. The client and server, in either case, needs to have in its possession, the public key of the trusted certification authority that signed the received certificate in order to verify it.

In the above noted embodiments where the server's public key is provided to the client, the same server public key was used for encryption and verification. However, the public key of the server 40 for encryption may be different than the public key for verifying signatures. In FIG. 5, for example, elements 31 and 37 could employ different public keys by storing two different public keys associated with the same server; one of which would be for verifying the server signatures at 31 and the other for encrypting data at 37 to be sent to the server. Alternatively, the certificate of the server could contain two separate keys along with identification as to their purposes. Moreover, in either alternative, element 43 of FIG. 5, for example, would provide appropriately different private keys to elements 17 and 51.

As an additional modification to the disclosed exemplary embodiments, the client's certificate (CERT-C) may be generated once by the certification authority and stored in the client's memory 21 or it may be a certificate generated by a certification authority whenever the client is authenticated to the certification authority, e.g. as part of a daily log-in procedure. Moreover, the authentication operation could be carried out by techniques described herein or by other authentication techniques. The new certificate could also contain the time at which authentication occurred and could expire later at some set time. Thus, the exposure time of the certificate would be limited if it is obtained by an opponent. The new certificate could also specify the types of operations for which the client is currently authenticated. Under such circumstances, the client would present the new certificate to the server to authenticate itself to the server, and the server would check that the certificate has not expired and that the client is authorized for a particular type of operation.

In financial applications, a certificate can be easily authenticated since it carries the digital signature of a certification authority. An account number cannot be easily authenticated because checking is done through accessing an on-line database. Therefore, in a financial application the certificate has clear benefits over an account number or an account number in combination with a PIN verification procedure.

In addition, if the account number contains check digits, they can usually be constructed by any third party with a public algorithm. Thus a third party can easily forge account numbers. For this reason, a database check is essential. Moreover, if the check digits are computed based on a secret key stored in the server, the same secret key must be stored in all servers. Therefore, an opponent who compromises one server can forge account numbers. This is another reason for the practice of having a central database perform the check. With certificates, the server stores only the trusted certification authority's public key, not the private key. Thus an opponent that compromises a server may obtain access to certificates known to that server, but does not gain the ability to form new ones.

As previously noted, the system as illustrated in FIG. 12 is more fundamental and has a more general protocol whereby a user is enabled to confidentially deliver a credential authorizing the user to perform an operation. In order to reflect the more fundamental system and protocol the terms "user", "credential" and "verifier" are used rather than "client", "certificate" and "server", respectively, so as to indicate the more general nature of the FIG. 12 exemplary embodiment. In FIG. 12 the credential includes information essential to verify the credential which is transmitted to a verifier by way of an encrypted communications channel. In the illustrated system the user 60 may be an individual, a computer or some other entity. Moreover, the credential can be stored on a smart card or other device held by the user or may be held on the user's computer. Furthermore, the encrypted communications channel 65 can be between the user's smart card and the verifier or the user's computer and the verifier. Additionally, the verifier can be a client, a server or some other entity on a computer network having a secure channel connected to the user whereby at least data essential for verifying the user's credential is transmitted to the verifier.

Although the credential held by the user would include a digital signature by a credential issuing authority, it is only necessary for the system illustrated in FIG. 12 to transmit some portion of the credential which would be necessary for verification of the credential to be transmitted to the verifier via the encrypted channel. That is to say, although the entire credential could be provided to the verifier via the encrypted channel, encryption could be limited to only portions essential for verification such as the digital signature on the credential, encryption of a secret value whose one way function value is stored in the credential or encryption of a path through a hash tree whose root is stored in the credential. Thus, element 62 would select all of the data of credential 61 or at least an essential portion thereof for transmission via the encrypted communication channel 66 for verification at 71 as illustrated in FIG. 12. Other non-selected data would be transmitted through a non-encrypted channel and input to the verification step in a manner similar to that which is illustrated in FIGS. 8 through 10, for example.

Stated differently, with regard to the embodiment of FIG. 12, although it is possible for all data of the credential to be transmitted through an encrypted channel, the primary focus of FIG. 12 is that only data essential for verification need be transmitted through the encrypted channel. Additionally, it is important to note that the operation as illustrated in FIG. 12 does not depend on operations with keys belonging to the user such as a digital signature by the user. Such keys, however, can be included in the credential, but verification operations do not depend thereon.

The credential can be verified by verifying the digital signature with the public key of the credential issuing authority and/or by performing other operations previously disclosed such as comparing the computed one way function of a transmitted secret value to the computed one way function of the secret value included in the credential or by checking the path through a hashtree.

With regard to the encrypted communications channel, the channel may comprise encryption with a secret key which is shared by both the user and the verifier, by the user's computer and the verifier or by encryption with the verifier's public key in a manner similar to that illustrated in the embodiment of FIG. 7. Where a shared secret key is used, the secret key may be established by any of a number of techniques including the use of a third party key server, the user or the user's computer generating a random secret key and encrypting it with the verifier's public key and sending it to the verifier as in previously disclosed embodiments. Moreover, a time stamp or other non-repeating values may be included in the process of establishing the key as in previous embodiments or by encrypting the data necessary to verify the credential or both. Additionally, in the event that encryption on channel 66 uses the verifier's public key, as in previously disclosed embodiments, a certificate for the verifier's public key may be verified first by the user or its computer.

As in the previously disclosed embodiments, the verifier of FIG. 12 is trusted not to reveal or misuse the user's credential. Moreover, since the data necessary to verify the credential is encrypted, the user is protected from opponents who cannot compromise the verifier's security. Moreover, since the credential includes a digital signature, the system is protected from opponents who can compromise the verifier's security since they can only reuse existing credentials and cannot generate new ones. In this regard, as noted with the previously disclosed embodiments, the user's credential can be obtained as a one-time value resulting from a successful log-in operation or can be obtained at some other interval. That is to say, the credential may authorize the user to perform certain operations and can also have further restrictions, such as limited time periods or limitations as to a list of authorized verifiers or servers.

In any event, the system as illustrated in FIG. 12, for example, provides the fundamental features of allowing a user to confidentially deliver to a verifier information which is essential for verifying a credential assigned by a certification authority which authorizes the user to conduct some transaction wherein the credential may or may not involve the use of a one way function but always contains the digital signature of the credential issuer.

Moreover, although the system illustrated in FIG. 12 merely illustrates the functional elements and blocks of a more fundamental system involving confidential delivery to a verifier of information essential for verifying whether a user is authorized to perform an operation, various features of the previously disclosed embodiments may also be included in the FIG. 12 embodiment. For example, as previously noted, encryption on the encrypted communication channel 66 may be obtained with a shared secret key pre-installed with the user and verifier or established by encryption with the verifier's public key. Alternatively, other well known techniques for establishing a secret key by agreement can be used such as through the use of a Diffie-Hellman algorithm. Additionally, encryption as in the embodiments of FIGS. 4A through 7 may be obtained through the use of the verifier's public key or the use of a non-repeating value such as a time stamp. Moreover, as aforementioned, the entire credential may be encrypted or only essential data of the credential may be encrypted with the remainder of the credential being transmitted unencrypted in the manners illustrated in FIGS. 8 through 10, for example.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. A method for authenticating a user with a verifier, comprising the steps of:
   (a) receiving by a user from a credential issuer a credential comprising the credential issuer's digital signature;
   (b) transmitting from the user to the verifier over an encrypted communications channel credential verification information; and
   (c) authenticating the user based on the validity of the credential issuer's digital signature and in response to the credential verification information.

2. The method of claim 1, further comprising the step of transmitting unencrypted a portion of the credential to the verifier.

3. The method of claim 1 wherein step (b) comprises transmitting at least a portion of the credential over the encrypted communications channel.

4. The method of claim 1, wherein step (b) comprises transmitting a time-varying message over the encrypted communications channel.

5. The method of claim 1, wherein:
   step (a) comprises receiving a credential comprising the result of a one-way function computed on a secret value;
   step (b) comprises encrypting and transmitting the secret value; and
   step (c) comprises:
      (i) computing the result of the one-way function computed on the secret value;
      (ii) comparing the computed result with the one-way function result contained in the credential; and
      (iii) verifying the validity of the credential issuer's digital signature.

6. The method of claim 5, further comprising, before step (a), the steps of:
   calculating a one-way function on a secret value; and
   transmitting the result of the one-way function computed on the secret value to the credential issuer.

7. The method of claim 1, wherein:
   step (a) comprises receiving a credential comprising a root of a hash tree; and step (b) comprises encrypting and transmitting at least a portion of a path through the hash tree; and step (c) comprises:
(i) verifying the path through the hash tree using the root contained in the credential;
(ii) comparing the computed hash tree root with the hash tree root contained in the credential; and
(iii) verifying the validity of the credential issuer's digital signature.

8. The method of claim 7, further comprising, before step (a), the steps of:

constructing a hash tree; and transmitting the root of the hash tree to the credential issuer.

9. The method of claim 1, wherein:

step (b) comprises encrypting and transmitting at least a portion of the credential issuer's digital signature; and step (c) comprises verifying the validity of the credential issuer's digital signature.

10. The method of claim 1 wherein step (c) comprises verifying the credential issuer's digital signature using the credential issuer's public key.

11. The method of claim 1, wherein step (b) comprises transmitting over a communications channel encrypted with a secret key shared by the user and the verifier.

12. The method of claim 1, wherein step (b) comprises transmitting over a communications channel encrypted with a key established with a key agreement technique.

13. The method of claim 1, wherein step (b) comprises transmitting over a communications channel encrypted with the verifier's public key.

14. The method of claim 1, wherein step (b) comprises transmitting over a communications channel encrypted with a key established by encryption with the verifier's public key.

15. The method of claim 1 further comprising the steps of:

receiving, by the user, a certificate comprising the verifier's public key; and verifying, by the user, the certificate comprising the verifier's public key.

16. The method of claim 1, wherein the credential issuer comprises the verifier.

17. The method of claim 1, further comprising, before step (a), the step of authenticating the user to the credential issuer.

18. The method of claim 1, wherein step (c) comprises determining that the credential is not included in a credential revocation list.

19. The method of claim 1, wherein step (a) comprises receiving a credential comprising at least one of:
(i) operations that the user is allowed to perform;
(ii) systems that the user is allowed to access;
(iii) locations that the user is allowed to access;
(iv) files or directories that the user is allowed to access;
(v) a valid time for the credential;
(vi) an expiration time for the credential; and
(vii) a list of verifiers with which the credential may be used.

20. The method of claim 1, wherein step (c) depends on an operation other than validation with the user's public key.

21. The method of claim 1 wherein step (a) comprises receiving a credential comprising the user's public key, and wherein step (c) is accomplished without operations involving the user's public key.

22. A system for authenticating a user, comprising:

a credential issuer issuing a credential comprising the credential issuer's digital signature;

a user element receiving the credential from the credential issuer and transmitting credential verification information over an encrypted communications channel; and a verifier authenticating the user in response to the validity of the credential issuer's digital signature and in response to the credential verification information.

23. The system of claim 22 wherein the user element transmits unencrypted a portion of the credential to the verifier.

24. The system of claim 22, wherein the user element transmits credential verification information comprising a time-varying message over the encrypted communications channel.

25. The system of claim 22 wherein the user element transmits at least a portion of the credential over the encrypted communications channel.

26. The system of claim 22, wherein:

the credential issuer issues a credential comprising the result of a one-way function computed on a secret value;

the receiver encrypts and transmits the secret value; and the verifier calculates a one-way function on the secret value, compares the calculated one-way function result to result in the credential, and verifies the validity of the credential issuer's digital signature.

27. The system of claim 26, wherein the user element calculates a one-way function on a secret value, and transmits the result of the one-way function computed on the secret value to the credential issuer.

28. The system of claim 22, wherein:

the credential issuer issues a credential comprising the root of a hash tree that is digitally signed by the credential issuer;

the receiver encrypts and transmits at least a portion of a path through the hash tree; and the verifier verifies the at least a portion of a path through the hash tree using the root contained in the credential, and verifies the validity of the credential issuer's digital signature.

29. The system of claim 28, wherein the user element constructs a hash tree, and transmits the root of the hash tree to the credential issuer.

30. The system of claim 22, wherein the receiver encrypts and transmits at least a portion of the credential issuer's digital signature, and the verifier verifies the validity of the credential issuer's digital signature.

31. The system of claim 22, wherein the verifier verifies the credential isuer's digital signature using the credential issuer's public key.

32. The system of claim 22, wherein the user element transmits over a communications channel encrypted with a secret key shared by the user and the verifier.

33. The system of claim 22, wherein the user element transmits over a communications channel encrypted with a key established with a key agreement technique.

34. The system of claim 22, wherein the user element transmits over a communications channel encrypted with the verifier's public key.

35. The system of claim 22, wherein the user element transmits over a communications channel encrypted with a key established by encryption with the verifier's public key.

36. The system of claim 22 wherein:

the certificate issuer issues a certificate comprising the verifier's public key; and the user element verifies the certificate comprising the verifier's public key.

37. The system of claim 22 wherein the credential issuer comprises the verifier.

38. The system of claim 22, wherein the user element authenticates to the credential issuer.

39. The system of claim 22, wherein the verifier determines that the credential is not included in a credential revocation list.

40. The system of claim 22, wherein the credential comprises at least one of:

(i) operations that the user is allowed to perform;

(ii) systems that the user is allowed to access;

(iii) locations that the user is allowed to access;

(iv) files or directories that the user is allowed to access;

(v) a valid time for the credential;

(vi) an expiration time for the credential; and (vii) a list of verifiers with which the credential may be used.

41. The system of claim 22, wherein the verifier depends on an operation other than the validation with the user's public key to authorize the user.

42. The system of claim 22 wherein the credential issuer issues a credential comprising the user's public key, and wherein the verifier authorizes the user without operations involving the user's public key.

* * * * *